US010466904B2

(12) United States Patent
Benisty

(10) Patent No.: US 10,466,904 B2
(45) Date of Patent: Nov. 5, 2019

(54) SYSTEM AND METHOD FOR PROCESSING AND ARBITRATING SUBMISSION AND COMPLETION QUEUES

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 15/585,717

(22) Filed: May 3, 2017

(65) Prior Publication Data
US 2018/0321844 A1 Nov. 8, 2018

Related U.S. Application Data

(63) Continuation-in-part of application No. 15/468,620, filed on Mar. 24, 2017.

(51) Int. Cl.
*G06F 3/06* (2006.01)
*G06F 13/18* (2006.01)
(Continued)

(52) U.S. Cl.
CPC ............ *G06F 3/061* (2013.01); *G06F 3/0659* (2013.01); *G06F 3/0688* (2013.01); *G06F 13/18* (2013.01);
(Continued)

(58) Field of Classification Search
CPC ................................ G06F 3/0659; G06F 3/061
See application file for complete search history.

(56) References Cited

U.S. PATENT DOCUMENTS 6,654,343 B1 * 11/2003 Brandis .................. H04L 49/30
370/229
9,317,204 B2 4/2016 Hahn et al.
(Continued)

FOREIGN PATENT DOCUMENTS

EP 2 312 457 A1 4/2011

OTHER PUBLICATIONS

Ellefson, Janene; SSD Product Market Manager—PCIe, Micron Technology, "NVM Express: Unlock Your Solid State Drives Potential", Flash Memory Summit 2013, Santa Clara, CA., 114 pages.
(Continued)

*Primary Examiner* — Zachary K Huson
(74) *Attorney, Agent, or Firm* — Brinks Gilson & Lione

(57) ABSTRACT

Systems and methods for processing and arbitrating submission and completion queues are disclosed. NVM Express (NVMe) implements a paired submission queue and completion queue mechanism, with host software on the host device placing commands into the submission queue. The memory device processes the commands through various phases including fetching, processing, posting a completion message, and sending an interrupt to the host. The memory device may process the commands based on the determined priority of the command. For example, the memory device may determine a priority for performing the phases after fetching the command. As another example, the memory device may perform the internal command selection based on a priority associated with the command. In this way, commands may be executed based on the priority needs of the memory device or of the host device.

21 Claims, 16 Drawing Sheets

(51) Int. Cl.
*G06F 13/26* (2006.01)
*G06F 13/42* (2006.01)

(52) U.S. Cl.
CPC .......... *G06F 13/26* (2013.01); *G06F 13/4282* (2013.01); *G06F 2213/0026* (2013.01)

(56) References Cited

U.S. PATENT DOCUMENTS

| | | |
|---|---|---|
| 9,927,983 B2 | 3/2018 | Benisty et al. |
| 2006/0161733 A1 | 7/2006 | Beckett et al. |
| 2012/0151472 A1 | 6/2012 | Koch et al. |
| 2014/0281040 A1 | 9/2014 | Liu |
| 2015/0067291 A1* | 3/2015 | Miyamoto ............ G06F 3/0659 711/167 |
| 2015/0127882 A1 | 5/2015 | Carlson et al. |
| 2015/0254088 A1 | 9/2015 | Chou et al. |
| 2016/0004438 A1 | 1/2016 | Moon et al. |
| 2016/0077740 A1 | 3/2016 | Hussain et al. |
| 2016/0085718 A1 | 3/2016 | Huang |
| 2016/0140041 A1 | 5/2016 | Niu et al. |
| 2016/0147442 A1 | 5/2016 | Baderdinni et al. |
| 2016/0188510 A1 | 6/2016 | Singh et al. |
| 2016/0267016 A1 | 9/2016 | Lee et al. |
| 2016/0292007 A1 | 10/2016 | Ding et al. |
| 2016/0321012 A1 | 11/2016 | Clark et al. |
| 2016/0342545 A1 | 11/2016 | Arai et al. |
| 2017/0075629 A1 | 3/2017 | Manohar et al. |
| 2017/0075828 A1 | 3/2017 | Monji et al. |
| 2017/0123659 A1 | 5/2017 | Nam et al. |
| 2017/0177222 A1 | 6/2017 | Singh et al. |
| 2017/0322897 A1 | 11/2017 | Benisty et al. |
| 2018/0095911 A1 | 4/2018 | Ballapuram et al. |
| 2018/0113615 A1 | 4/2018 | Park |
| 2018/0173461 A1* | 6/2018 | Carroll .................. G06F 3/0659 |
| 2018/0217951 A1 | 8/2018 | Benisty et al. |
| 2018/0260152 A1 | 9/2018 | Bar et al. |
| 2018/0275872 A1 | 9/2018 | Benisty et al. |
| 2018/0321945 A1 | 11/2018 | Benisty |

OTHER PUBLICATIONS

Marks, Kevin; Dell, Inc., "An NVM Express Tutorial", Flash Memory Summit 2013, Santa Clara, CA., 92 pages.
U.S. Appl. No. 15/148,409, filed May 6, 2016, 45 pages.
Specification and Drawings of U.S. Appl. No. 15/457,676 entitled "Storage System and Method for Thermal Throttling via Command Arbitration", filed Mar. 13, 2017; 32 pages.
International Search Report and Written Opinion in Application No. PCT/US2018/019933 dated May 22, 2018, 12 pages.
International Search Report and Written Opinion in Application No. PCT/US2018/019941 dated Jul. 13, 2018, 18 pages.
NVMe Express Workgroup: "NVM Express 1.2", dated Nov. 3, 2014, obtained from the Internet on Aug. 9, 2018 from URL: <http://nvmexpress.org/wp-content/uploads/NVM_Express_1_2_Gold_20141209.pdf>, 205 pages.
Non-Final Office Action dated Nov. 23, 2018 for U.S. Appl. No. 15/585,753, 15 pages.

* cited by examiner

US 10,466,904 B2

SYSTEM AND METHOD FOR PROCESSING AND ARBITRATING SUBMISSION AND COMPLETION QUEUES

REFERENCE TO RELATED APPLICATION

This is a continuation-in-part application of U.S. application Ser. No. 15/468,620, filed on Mar. 24, 2017.

BACKGROUND

NVM Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
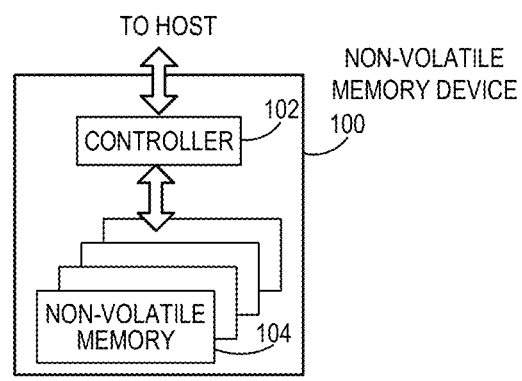
FIG. 1A is a block diagram of an exemplary non-volatile memory system.

In NVMe, processing of the commands follow a sequence of phases. As discussed in more detail below with regard to FIG. 3, in a first phase, the host device places a command in the submission queue, and thereafter notifies the memory device that the command has been placed in the submission queue. Responsive to the notification by the host device, the memory device fetches the command from the submission queue. Thereafter, the memory device processes the command (e.g., the memory device performs internal command selection, executes the command (such as performing a write or a read), etc.). After processing the command, the memory device places an entry on the completion queue, with the entry indicating that the execution of the command has completed. The memory device then generates an interrupt to the host device indicating that an entry has been placed on the completion queue. The host device reviews the entry on the completion queue and then notifies the memory device that the entry on the completion queue has been reviewed.

The host device may configure multiple submission queues, and may place commands on the respective submission queues. In that regard, the memory device may use one or more arbitration schemes in order to determine the order of the commands to fetch from the multiple submission queues. One type of submission queue is an administrative submission queue, which includes administrative commands to the memory device. Example administrative commands include, but are not limited to: Get Log Page (e.g., retrieves an NVMe log page from an NVMe device and provides the retuned structure); Identify (e.g., returns a data buffer that describes information about the NVMe subsystem, the controller or the namespaces), Get Features (e.g., retrieves the attributes of the Feature specified)/and Set Features (e.g., specifies the attributes of the Feature indicated). The administrative commands listed are merely for illustration purposes.

The administrative submission queue may be assigned a high priority (or the highest priority relative to other submission queues). In particular, the other submission queues may be assigned lower priorities, such as the following (in decreasing order of priority): urgent; high priority; medium priority; and low priority. Commands on the other submission queues may relate to data transfer, such as read commands (e.g., reading data from the flash memory) and write commands (e.g., writing data to the flash memory). The host device may assign a respective priority to a submission queue at initialization of the submission queue.

In determining which commands to fetch from the submission queues, the memory device may use a static arbitration algorithm, such as a round-robin algorithm or a weighted round-robin algorithm, in order to determine the order in which to fetch commands from the multiple submission queues. With the round-robin, the memory device selects the commands placed in the different submission queues in a symmetrical manner. For example, the round-robin fetches commands from the different queues in a predetermined order regardless of priority of the submission queue. With the weighted round-robin, the memory device selects the commands placed in the different submission queues in a non-symmetric way in which each submission queue has its own priority assigned by the host device at the initialization phase. For example, the weighted round-robin may determine if there is a command in the administrative submission queue or a submission queue designated as urgent. If not, the weighted round-robin may weight commands on "high priority", "medium priority", and "low priority" submission queues to determine which commands to fetch (e.g., weight the commands on the "high priority" submission queues higher than the commands on the "medium priority" or "low priority" submission queues. Alternatively, t the memory device may use a static arbitration algorithm in which certain queues are given higher priority. For example, fetching commands from the administrative submission queue may be given higher priority than fetching commands from other submission queues not designated as an administration queue since the administrative submission is assigned the highest priority In one implementation, the memory device may determine a priority for performing the phases after fetching the command(s). As discussed above, example phases after fetching include: processing the command (e.g., performing internal command selection, executing the command, such as data transfer), posting the completion message; and generating an interrupt to the host device indicating that an entry has been placed on the completion queue. The listed phases after fetching are merely for illustrative purposes. Additional or different phases are contemplated. The memory device may determine priority for a command (or for performing one or more phases) based on one or more criteria including any one, any combination or all of the following: (1) priority of the respective command; (2) internals of the memory device (e.g., the state of the die or the processing capability of the memory device, as discussed below); (3) power consumption; (4) state of the communication interface between the host device and the memory device (e.g., the status of the ingress and/or egress path); and (5) the phases of the commands subject to execution.

The memory device may determine the priority of the command in one of several ways. In a first way, the priority may be determined based on the respective submission queue on which the command was placed and/or based on the respective completion queue on which the entry to indicate completion of the command is placed. In one implementation, upon initialization of a particular submission queue, the host device may assign a priority to the particular submission queue. Thereafter, the memory device may determine the particular submission queue on which the command was placed, and assign the priority of the particular submission queue to the respective command. For example, the host device may configure an administrative submission queue upon initialization and assign the highest priority, as discussed above. In another specific implementation, the memory device may determine the priority for a respective completion queue based on the priority of the submission queue that is associated with the respective completion queue.

In a second way, the memory device may determine the priority of the command based on one or more aspects of the command. In a first example, the memory device may determine the priority of the respective command based on an address (such as a logical block address LBA) (or an address range (such as an LBA range)) within the respective command. For example, the memory device may assign a higher priority to a command that includes an address (or an address range) which is frequently accessed by the memory device, than to another command with an address (or an address range) which is less frequently accessed by the memory device. In this regard, frequent accesses may be processed more quickly. In a second example, the memory device may determine the priority of the command based on the type of command. For example, a forced unit access (FUA) command is a command that instructs the memory device to store data to the flash memory (as opposed to storing the data in cache). In this regard, the memory device may treat an FUA command as urgent since the memory device cannot post an entry to the completion queue for this command until the data is stored in the flash memory. In this regard, the memory device controller may include a table that correlates types of commands to levels of urgency. In a third example, the memory device may prioritize the command based on the size of the data transfer of the command. In particular, the memory device may prioritize a command that dictates a smaller amount of data read from flash memory (e.g., below a predetermined amount) or a smaller amount of data written to flash memory. In a fourth example, the memory device may analyze randomness of at least one aspect associated with the command, and determine, based on the analyzed randomness, the priority of the command. In a specific example, the memory device may analyze the memory location (or set of locations) subject to a read command. In response to determining that the memory location (or set of locations) is random (no pattern of reading from this memory location), the memory device may assign a higher priority to the command. Thus, in one implementation, a higher randomness of a command may be indicative of a greater importance to the host device, and therefore correlates to a higher priority assigned by the memory device.

As discussed above, one phase after fetching is internal command selection, which may comprise: (1) command queuing; and (2) command scheduling. In one implementation, the memory device performs the internal command selection based on internals of the memory device, such as the internal state machine of the memory device and/or the internal states of the flash die(s). In particular, each die of the flash memory may be in one of several states, and may be unavailable for performing operations. For example, while data is being written to a flash die, the flash die is in the program state and cannot be accessed. Likewise, if the flash die is performing garbage collection, the flash die may be unavailable. In that regard, execution of commands, such as read or write commands, is dependent on the state of the particular die. The memory device controller may thus execute the commands on flash dies that are available and delay execution on flash dies that are unavailable. In another implementation, the memory device controller may select the phase of operation based on the processing capacity of the memory device controller. As discussed herein, reads from the flash memory may further include error correction, encryption or decryption, and the like. These operations may be computationally intensive. As such, depending on the current processing capacity of the memory device controller, the memory device controller may select certain phases of operation. For example, in response to determining that the memory device controller's current processing capacity is reduced, the memory device controller may select phases of operation that are less computationally intensive (such as sending a read request to the host device). Conversely, in response to determining that the memory device controller has available processing capacity, the memory device controller may select phases of operation that are more computationally intensive (such as reading data from the flash memory, performing error correction and decryption). In still another implementation, the memory device controller may arbitrate amongst commands that are in a same phases. For example, a set of commands may be in the execution phase, such as performing a write to or a read from the flash memory. The memory device controller may prioritize all commands that are operating in a particular phase (such as the execution phase). Alternatively, the memory device controller may prioritize a certain type of commands that are operating in a particular phase (such as all read commands in the execution phase or all write commands in the execution phase).

In another implementation, the memory device may perform the internal command selection based on a priority associated with the command. As discussed above, priority may be determined in one of several ways, including, for example, the priority of the submission queue from which the command was fetched, the type of command, or the address range of the command. In still another implementation, the memory may perform the internal command selection based on both the priority associated with the command and the internals of the memory device (e.g., the internal state machine of the memory device and/or the internal states of the flash die(s)).

Further, the memory device may determine priority based on power consumption associated with performing the various phases of processing the command. As discussed above, the various phases include fetching the command, processing the command, posting the completion message, and generating an interrupt. Various phases, such as processing the command, may require more power. During certain time periods, the memory device may wish to conserve power, and thus may delay performing certain actions, such as writing to the flash memory, in order to conserve power. Likewise, the memory device may have a power consumption limit that the memory device is instructed not to exceed. In this regard, the memory device may perform phases for the commands in order not to exceed the allotted memory consumption guidelines.

In addition, the memory device may determine priority based on the state of the communication interface between the memory device and the host device (e.g., the status of the ingress and/or egress path). In one implementation, the communication interface between the host device and the memory device is simplex, with communications to and communications from the memory device on the same path. In another implementation, the communication interface between the host device and the memory device is full duplex and includes an ingress path (whereby the memory device receives communications, such as read or write requests, from the host device) and an egress path (whereby the memory device sends communications, such as read or write requests, to the host device). In this implementation, the ingress path and egress path operate independently of one another. The phases of commands may necessitate communication via the communication interface (either via the single path or via the ingress path or the egress path). As discussed below, the memory device may determine a need in processing different commands to use the communication interface (either in the simplex configuration or the duplex configuration) and select, based on priorities and the need, an order in which to process the commands.

In the simplex example, the memory device may arbitrate amongst all of the commands that access the communication interface and prioritize the commands (or prioritize activities in processing the commands), as discussed further below. In the duplex example, the memory device may arbitrate amongst all of the commands, such as arbitrate amongst the different activities that result in ingress or egress path communications in processing the commands, and prioritize those commands (such as prioritize activities in processing the commands). As discussed in more detail below, processing of commands may include communications from the memory device to the host device via the egress path, and may include communications from the host device to the memory device via the ingress path. Further, an egress communication from the memory device may prompt the host device to send an ingress communication to the memory device.

As one example, the host device may issue a write command (e.g., for the memory device to write data to flash memory on the memory device). In order for the memory device to obtain the data to write to flash memory, the memory device sends, via the egress path, to the host device a PCIe read request. Responsive to the PCIe read request, the host device sends the data (which is to be written by the memory device to flash memory) to the memory device via the ingress path. In this regard, responsive to the memory device determining that a path, such as the ingress path, is busy, the memory device may modify operations accordingly, such as delaying the PCIe read request (which results in a communication via the ingress path), as discussed in more detail below. As another example, the memory device, fetching the command from the SQ resident in the host device, uses the egress path to read the command from the SQ using a TLP read request. As still another example, the host device, writing to the SQ doorbell register, uses the ingress path. The memory device may determine the state of the egress path (e.g., the level of activity of the egress path) to determine which phase to perform. In particular, in response to the memory device determining that the egress path has a high level of activity, the memory device may prioritize operations that do not require use of the ingress path. Likewise, in response to the memory device determining that the egress path has a high level of activity, the memory device may prioritize operations that do not require use of the egress path, as discussed in more detail below.

Still another criterion in determining priority comprises the phases of the commands subject to execution. Separate from arbitrating amongst commands within a specific phase (such as processing the command; placing an entry on the completion queue; interrupting the host device; etc.), the memory device controller may arbitrate amongst the different phases while communicating with the host device (e.g., accessing memory on the host device). For instance, PRP fetching, data transfer and completion posting may request the egress bus to the host device at the same time. Similar to determining, based on priority, which commands within a same phase to perform, the arbitration logic may also consider the priority of the command in such scenarios. For example, a specific PRP fetching command may have a higher priority than a command subject to completion posting. In that regard, the specific PRP fetching command may take precedence (and transmit via the egress bus) over the command subject to completion posting.

More specifically, a command undergoes various phases that are performed by the memory device, such as fetching, execution, posting an entry to the completion queue, and sending an interrupt to the host device. In this regard, the memory device may have different commands in various phases. The memory device may analyze the commands in the various phases and prioritize the actions the memory device is to perform based on the particular phase of a specific command, or based on comparing phases of different commands. In a first implementation, the memory device may include a priority associated with the different phases. As one example, the memory device may prioritize the phases in the following order (from highest priority to lowest): command fetching; PRP fetching; data transfer; completion queue posting; and interrupt notification. As another example, the completion queue posting and the interrupt notification may have a higher priority than command fetching, PRP fetching and data transfer. In another implementation, the memory device may prioritize commands that are post execution (e.g., posting the entry to the CQ or sending the interrupt) since the host device may be awaiting these actions. In a second implementation, the memory device may prioritize the commands by attempting to balance commands at the various phases. In one instance, the memory device may have most commands at the post-fetch phases, and therefore prioritize fetching commands in order to balance the phases. In another instance, the memory device may have an excessive amount of fetched commands (greater in number than a first predetermined amount). In that regard, other phases, such as post-fetching phases, may be prioritized until the number of commands at the fetched stage has been reduced below a second predetermined amount. In a third implementation, the memory device may determine priority of the phases based on the type of command or the type of process related to a command (e.g., a read PCIe request or a write PCIe request). In a fourth implementation, the memory device may determine priority of the phases based on allocation of memory device resources (e.g., use of buffer memory in DRAM, amount of data to transmit to the host device, or the amount of processing performed by the memory device). In a fifth implementation, the memory device may determine priority of the phases based on depth of processing of the command, with commands further processed receiving higher priority, as discussed in more detail below.

In practice, commands are fetched from multiple submission queues. The fetched commands are placed in a single queue as a first-in-first-out (FIFO). Without further reordering, the commands may be executed in this FIFO sequence. Alternatively, the commands may be reordered based on priority, and then executed based on the reordering. As one example, the memory device controller may include a single reordering queue used for reordering the commands from the FIFO queue. As another example, the memory device controller may include multiple specific queues used for reordering. In either example, the commands may be reordered based on priority.

Example specific queues include: administrative submission command queue (in which commands from the administrative submission queue are placed); urgent submission command queue; high priority submission command queue; medium submission command queue; and low submission command queue. Other specific queues are contemplated.

Alternatively, or in addition, the following command queues may be used: one or more read command queues (in which read commands from the submission queues are placed); one or more write queues (in which write commands from the submission queues are placed); one or more physical region page (PRP) queues; etc. In the case of read queues, there may be a single read queue that lists all read commands. Alternatively, there may be multiple read queues dependent on one or more aspects of the read commands. As one example, the multiple read queues may be based on the amount of data to be read. In particular, commands for smaller reads (such as 4K or less) may be placed in a smaller read queue and commands for larger reads (such as greater than 4K) may be placed in a larger read queue. In that regard, execution of commands from the smaller read queue may take precedence over execution of commands from the larger read queue. As another example, the multiple read queues may be based on the address (or address range) to be read. In particular, an address (or address range) that is frequently read may be placed in a frequently read queue, and an address (or address range) that is infrequently read may be placed in an infrequently read queue. In this way, execution of commands from the frequently read queue may take precedence over execution of commands from the infrequently read queue.

Similarly, in the case of write queues, there may be a single write queue that lists all write commands. Alternatively, there may be multiple write queues dependent on one or more aspects of the write commands. For example, the multiple write queues may be based on the amount of data to be written, or the frequency/infrequency of writes to an address (or address range). Thus, the arbitration as to which command to select for execution may be based on the priority associated with the command.

In the case of PRP fetching commands, in order to increase performance, the memory device may execute several commands in parallel. Certain NVMe commands, such as read commands and write commands, may include a pointer to a section of host device memory. For example, a read command may include a pointer to a PRP list, with the PRP list indicating the sections in memory where the memory device should store the data that was read responsive to the read command. As another example, a write command may include a pointer to a PRP list, with the PRP list indicating the sections in memory where the memory device should read the data that is for storage on the flash memory of the memory device. In processing the command, the memory device may obtain the PRP list by send one or more PRP fetching requests to the host device. In this regard, the memory device may send several PRP fetching requests, which are associated with different NVMe commands. As discussed in more detail below, the priority of the command associated with a specific PRP fetching request may be considered in determining when to execute the specific PRP fetching request.

After execution of the command, the memory device performs one or more post execution phases (such as posting an entry to the completion queue and sending an interrupt to the host device notifying of an entry posted on the completion queue). In one implementation, the memory device may perform one or more of the post execution phases based on the priority of the command.

For example, completion posting and interrupt posting may occur in parallel. Thus, the priority of the command may be considered when determining the order in which posts to the completion queue and/or posts for interrupting the host device are performed. For example, the one or more completion queues may have associated priorities. As discussed in more detail below, there is typically a 1:1 mapping between submission queues and completion queues. Alternatively, the mapping between submission queues and completion queues is not 1:1. In the instance of a 1:1 mapping, in one implementation, the priority of the completion queue is equal to the relevant submission queue. When several submission queues are associated with the same completion queue, the priority of the completion queue may be equal to the highest submission queue priority associated to this completion queue. Similar analysis of completion queue priorities may be considered when determining when to post interrupts to the host device.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory die(s) 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings. As discussed in more detail below, there may be a single communication channel between the host device and the memory device. The single communication channel may be simplex or duplex. In the simplex implementation, communications to and from the memory device are on the same channel. In this regard, the memory device may determine which communication receives the highest priority. In the duplex implementation, the communication interface has an ingress path (into the memory device) and an egress path (from the memory device). As discussed above, the memory device may determine priority for communications separately for the ingress path and the egress path.

Figure 1B:
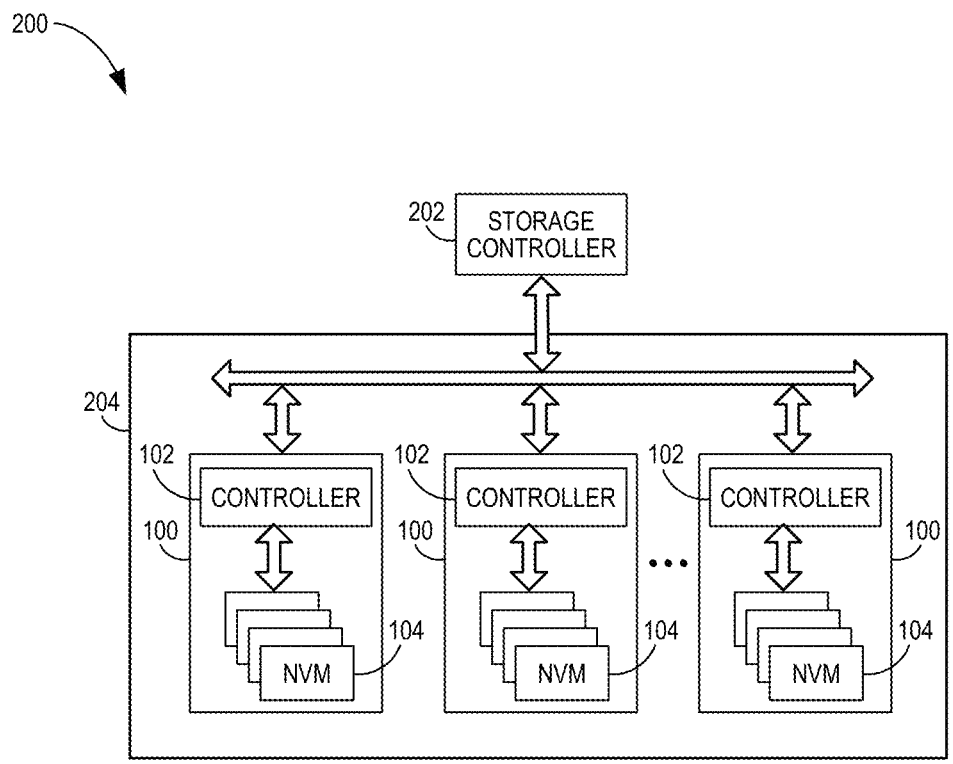
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
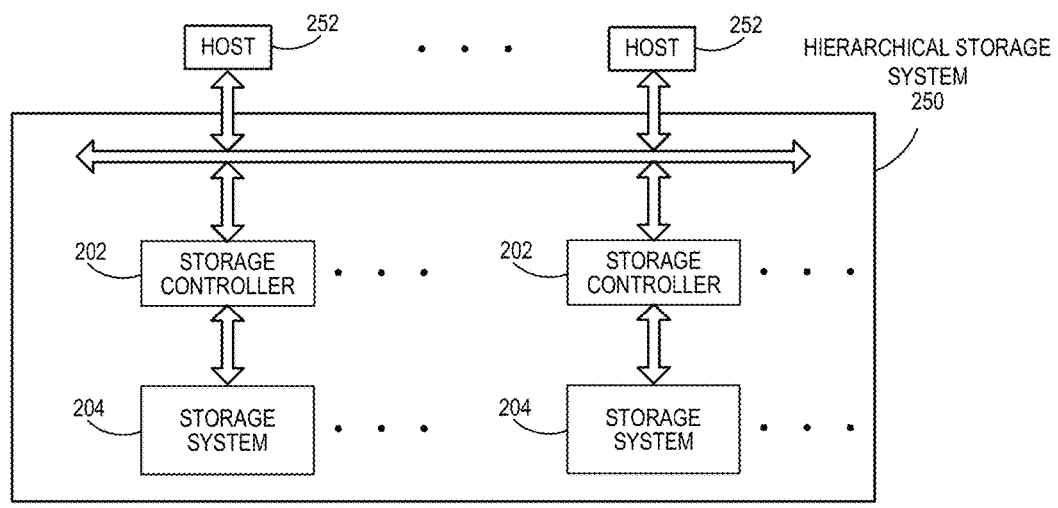
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
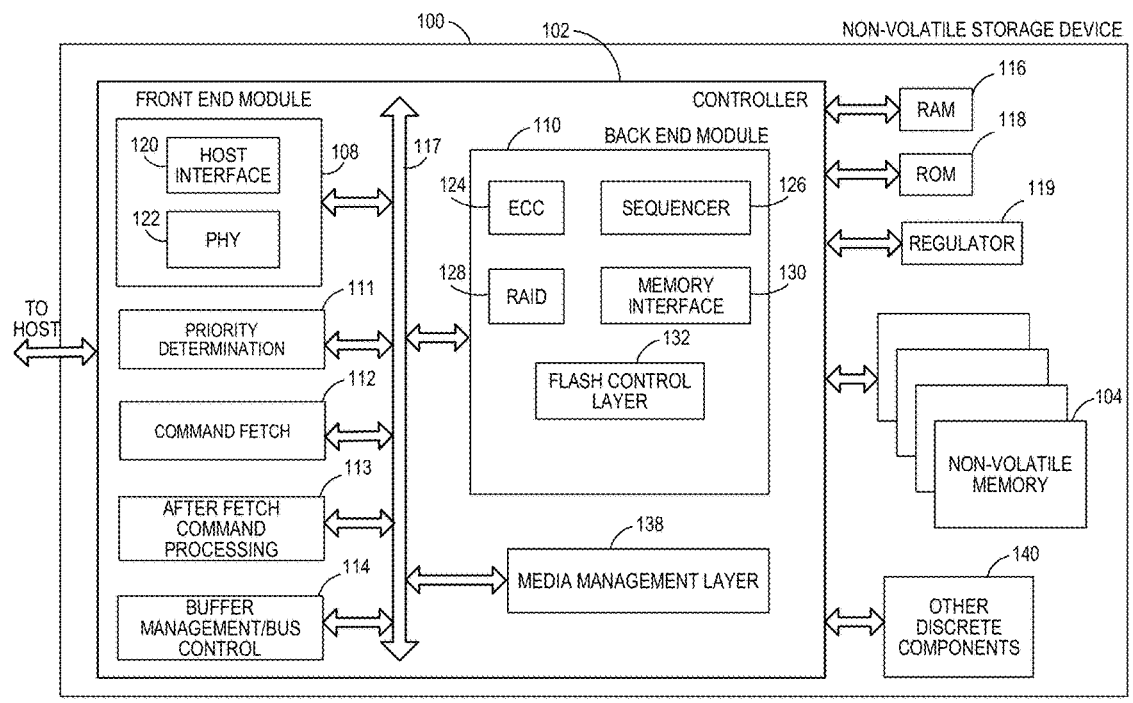
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32 G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus control module 114 are optional components that may not be necessary in the controller 102.

Other modules of the non-volatile memory device 100 illustrated in FIG. 2A may include priority determination module 111, command fetch module 112, and after fetching command processing module 113. These modules are shown as separate from the other modules of the non-volatile memory device 100, although in other configurations, one or more of them may be part of any of the other modules.

As discussed in more detail below, the memory device may determine a priority of the command using the priority determination module 111. For example, the priority determination module 111 may analyze the command itself, or the submission queue from which the command was fetched in order to determine the priority of the command. Further, the command fetch module 112 may include logic to determine the order in which to fetch commands from the various submission queues. In addition, the after fetching command processing module 113 may determine, based on the determined priority of the command, processing of the command after fetching, as discussed in more detail below.

Figure 2B:
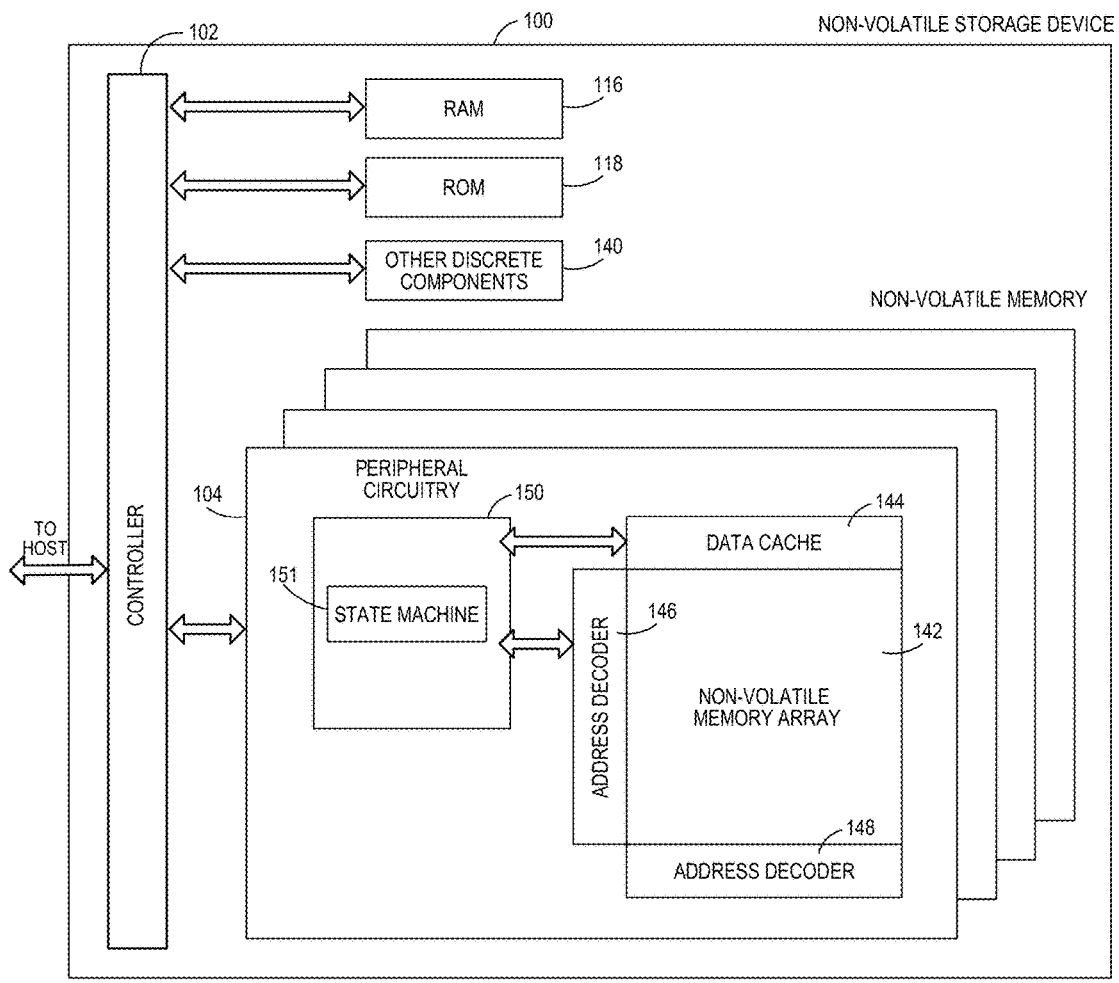
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
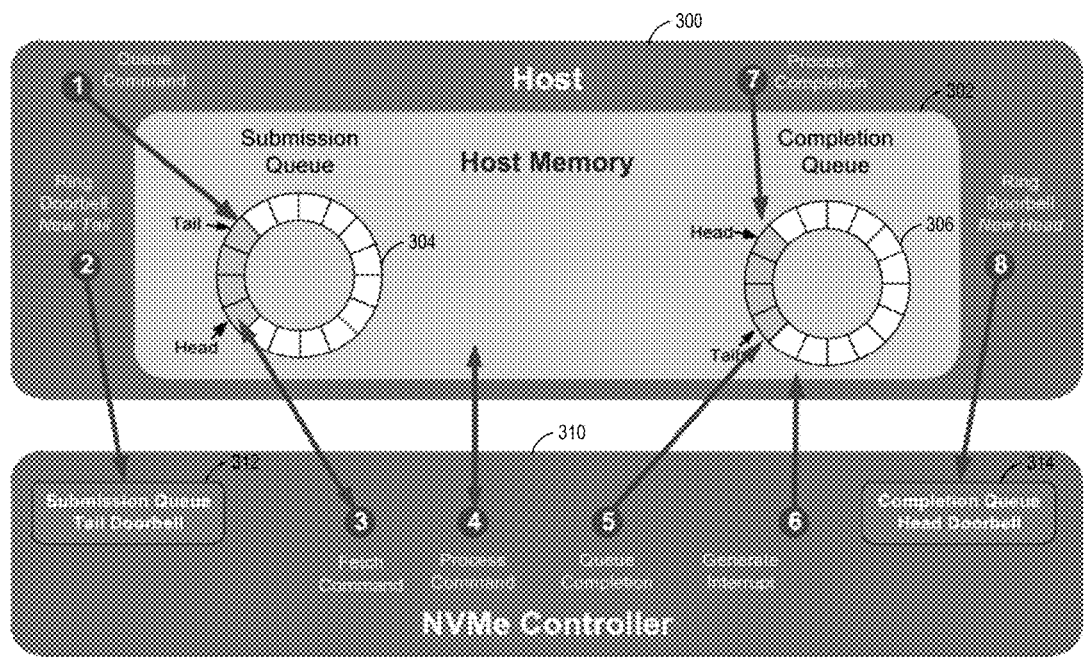
FIG. 3 is a block diagram of the host device and NVMe controller illustrating a sequence for a host device and a memory device to request and process an NVMe command.

FIG. 3 illustrates a sequence of steps for executing a command via the NVMe standard. As shown, the host device 300 includes host memory 302, and the memory device includes a controller, such as an NVMe controller 310. In one implementation, the host memory 302 includes a submission queue 304 and a completion queue 306. In practice, at the initialization phase, the host device 300 creates one or more submission queues and one or more corresponding completion queues. As discussed above, in one implementation, the submission queues and completion queues may have a 1:1 correlation, and in another implementation, the submission queues and completion queues do not have a 1:1 correlation.

For initialization, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, such as shown in FIG. 3, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer), the memory device may monitor a communication interface between the host device 300 and the memory device for particular communications, such as writing to the submission queue(s) resident on the memory device. For example, the memory device can monitor the transport layer packets (TLPs) on the PCI Express bus to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device queued one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s)), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In a submission queue resident in the host device, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCIe TLPs to transfer the data from the memory device to the host device 300. Typically, the transferred data is stored in the host memory 302 of the host device 300 based on an indication in the command (e.g., the command may include an address at which to store the requested data).

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSI-X interrupt). The interrupt may be indicative to the host that there are one or more entries on the completion queue.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
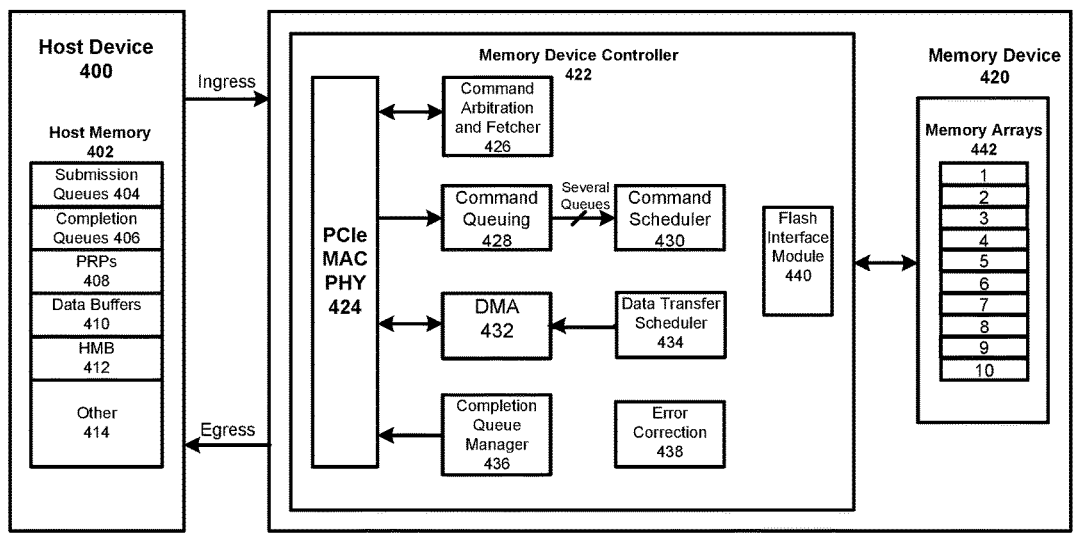
FIG. 4 is a block diagram of other exemplary components of a host device and a memory device.

FIG. 4 is a block diagram of other exemplary components of a host device 400 and a memory device 420. The host device 400 includes host memory 402, which may comprise one or more submission queues 404, one or more completion queues 406, Physical Region Page (PRP) 408, data buffers 410, Host Memory Buffer (HMB) 412, and other memory 414.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read a data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device. In one example (with the SQ and the CQ resident on the host device), responsive to a TLP write request (sent via the ingress path) by the host device to the doorbell register on the memory device (with the write to the doorbell register indicating that there is a command on the SQ), the memory device uses a TLP read request (sent via the egress path) to fetch the write command from the SQ (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the CQ (indicating that the write command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

As another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with storage buffers interspersed between each of the serial operation. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing the data to the host device, the memory device uses a TLP write request to write an entry to the CQ (indicating that the read command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

Optionally, the CQ and SQ may be resident in the memory device, such as in the Controller Memory Buffer (CMB). In that instance, the host device may send a TLP write request (sent via the ingress path) to the memory device to write to the SQ. Likewise, the memory device may send a TLP write request (sent via the egress path) to generate an interrupt to the host device.

The allocation of memory to the Submission Queues and Completion Queues in the host memory buffer may be physically located contiguously or non-contiguously. In the instance of non-contiguous NVMe Submission Queue and/or Completion Queue, a PRP list is provided to the memory device. The PRP list contains a list of pointers that describes the location of each physical section of the relevant queue, as discussed in more detail below. In practice, the PRP list is stored in the host device memory and is not modified during the entire life of the relevant queue. In addition, a pointer to the PRP list may be used to point to at least a part of the PRP list. Each of the PRP list and pointer to the PRP list may be included at PRP 408. As discussed in more detail below, there may be multiple PRP lists stored in PRP 408.

Memory device 420 includes the memory device controller 422 and memory arrays 442. Memory array 442 may be segmented in various ways, such as in 10 sections as illustrated in FIG. 4. The memory device controller 422 may incorporate one or all of a PCIe MAC and PHY interface 424. Further, the memory device controller 422 may include various functions that factor in the priority of the command, as discussed in more detail below. The command may include various phases, some of which may be performed by memory device 420. One, some, or all of the phases performed by the memory device 420 may factor in the priority of the command in determine when to perform the function associated with the phase (e.g., partly or solely using the priority to determine when to perform the function). FIG. 4 includes various blocks that indicate functions performed by memory device controller 422 that may account for priority of the command. For example, memory device controller 422 may include command arbitration and fetcher 426, which as discussed above may use an algorithm, such the round-robin or weighted round-robin, between the submission queues and for fetching the commands.

In addition, command queuing 428 is configured to queue part or all of the fetched NVMe commands for further processing. Command scheduler 430 is configured to select the next pending command for further execution from command queuing 428. As shown in FIG. 4, there may be several queues from which to select from. Thus, the command scheduler 430 may select which command from amongst the several queues based at least in part on the priority of the command(s). Data transfer scheduler 434 is configured to schedule one or more types of data transfers. As one example, read data may arrive from different memory arrays in parallel. Data transfer scheduler 434 may arbitrate, based on priority of the read data (e.g., the priority of the different read commands) from amongst the different data transfers.

Direct Memory Access (DMA) 432 is configured to perform the actual data transfer between host device 400 and memory device 420. Completion queue manager 436 is configured to post completion entries to the completion queues 406, while also handling the relevant pointers. Error correction 438 is configured to correct the data that is fetched from the memory arrays 442. Flash interface module 440 is configured to control and access the memory arrays 442. Thus, using the various functions illustrated in blocks in FIG. 4, memory device controller 422 may use the priority of the command (e.g., the priority of the submission queue from which the command is obtain may be assigned to the command) through part of, or throughout the entire, command execution flow performed by the memory device 420.

Figure 5:
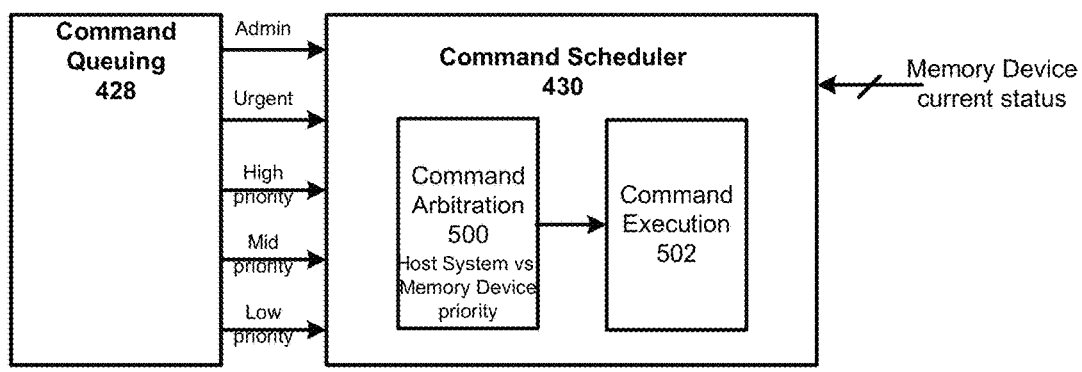
FIG. 5 is a block diagram of the command queuing and command scheduler illustrated in FIG. 4.

FIG. 5 is a block diagram of the command queuing 428 and command scheduler 430 illustrated in FIG. 4. As shown, command queuing 428 may send one or more queues to the command scheduler 430. As discussed above, command queuing may segment the commands into one or more queues, such as Admin, Urgent, High Priority, Mid Priority, and Low Priority. Thus, in one implementation, when the weighted round-robin arbitration scheme is selected by the host device 400 as the algorithm for the memory device 420 to use, command queuing 428 may direct the commands to command scheduler 430 through several internal queues (e.g., Admin, Urgent, High, Mid and Low priority queues as illustrated in FIG. 4). Alternatively, command queuing 428 may use a round-robin arbitration scheme to determine in which order to direct the commands to the command scheduler 430. The designation of the various queues are merely for illustration purposes. Other queues are contemplated. Alternatively, command queuing may output a single queue with a designation of the associated priority. For example, the entries in the single queue may each have an associated priority. In this regard, command queuing 428 may queue part or all the NVMe commands that were fetched from submission queues 404 in host memory 402.

Command scheduler 430 receives commands from command queuing 428, arbitrates between the commands, and selects the command that will be executed next. In one implementation, the command scheduler 430 arbitrates amongst the different commands based solely on the priority associated with the commands. In another implementation, the command scheduler 430 arbitrates amongst the different commands based on the priority associated with the commands and the current internal state of the memory device 420 (e.g., such as based the state of memory arrays 442). For example, command arbitration 500 may be based on one or more internal parameters of the memory device 420 (such as current memory array state) and also on the priority of the command which was assigned by the host device 400. This is illustrated in FIG. 5 as host device vs memory device priority. Command arbitration 500 may thus output the order of commands for execution by command execution 502.

Figure 6:
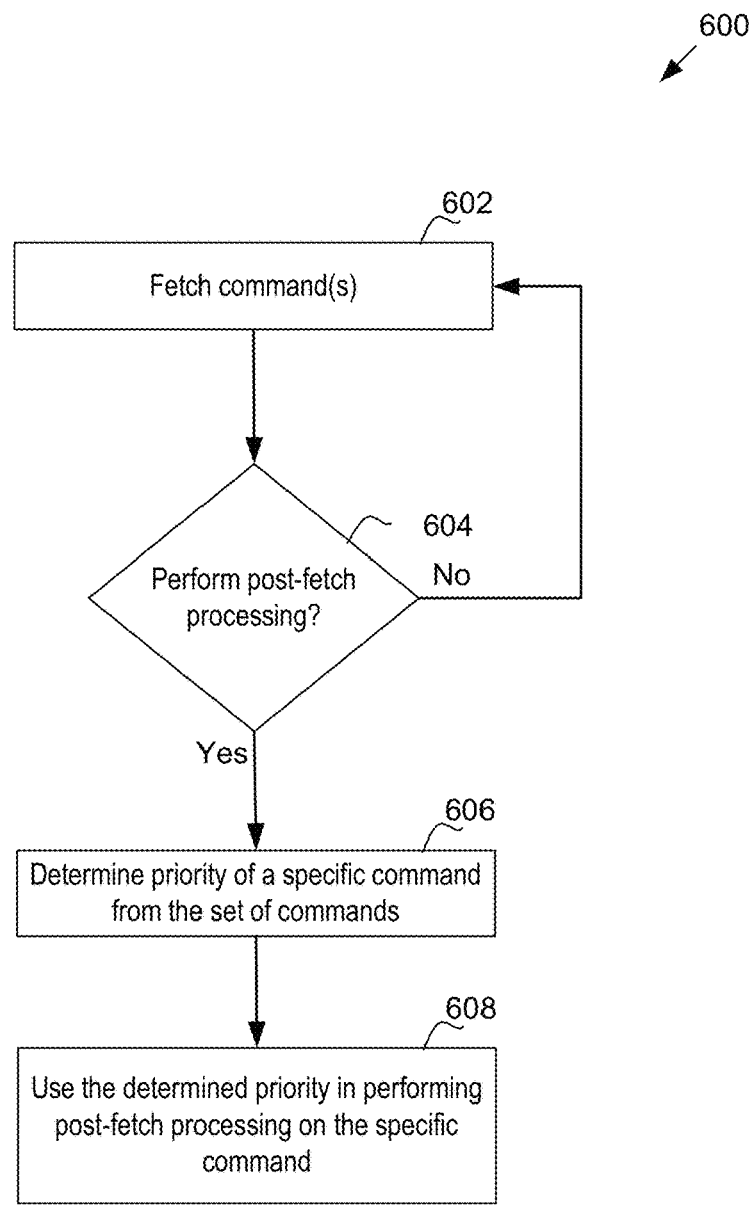
FIG. 6 is a flow chart of a first example of prioritizing processing of commands after fetching the commands from the submission queue.

FIG. 6 is a flow chart 600 of a first example of prioritizing processing of commands after fetching the commands from the submission queue. At 602, one or more command are fetched from the submission queue(s). As discussed above, the fetching may be based on one or more algorithms, such as round-robin or weighted round-robin. At 604, it is determined whether to perform post-fetch processing. In one implementation, post-fetch processing comprises any processing that the memory device performs on the command (e.g., queuing, scheduling, execution, posting, interrupting) after fetching of the command from the submission queue. At 606, the priority of a specific command from the set of commands may be determined. At 608, the determined priority is used in performing the post-fetch processing on the specific command. In one implementation, the determined priority may comprise a priority relative to another command. In that regard, in response to determining that the priority for the specific command is higher than the priority of another command, one or more parts of post-fetch processing on the specific command may take precedence over another command. In another implementation, the determined priority is not compared relative to another command. For example, admin commands may comprise a highest priority. In that regard, a specific command with an "admin" priority may be processed without comparing the priority to another command.

Figure 7:
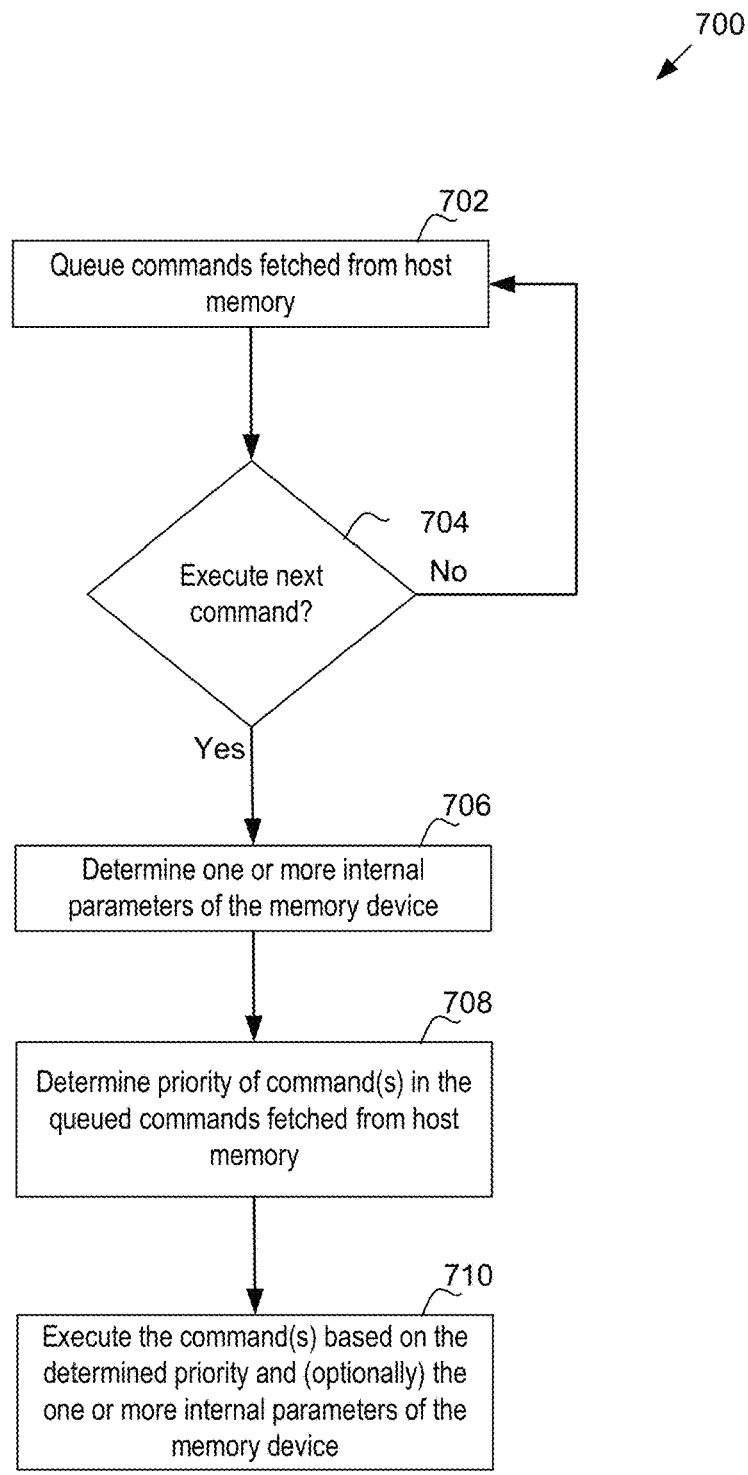
FIG. 7 is a flow chart of a second example of prioritizing processing of commands after fetching the commands from the submission queue.

FIG. 7 is a flow chart 700 of a second example of prioritizing processing of commands (such as execution of commands) after fetching the commands from the submission queue. At 702, the commands that were fetched from the submission queue in host memory are queued. At 704, it is determined whether to execute the next command. If yes, at 706, one or more internal parameters of the memory device (such as the state of memory array 442) are determined. At 708, the priority of one or more commands in the queued commands fetched from the host memory are determined. At 710, the commands may be executed based on the determined priority and optionally the one or more internal parameters of the memory device. As shown in FIG. 7, the internal parameters and the priorities are determined in response to determining to execute the next command. Alternatively, the internal parameters and the priorities may be determined prior to determining to execute the next command.

Figure 8:
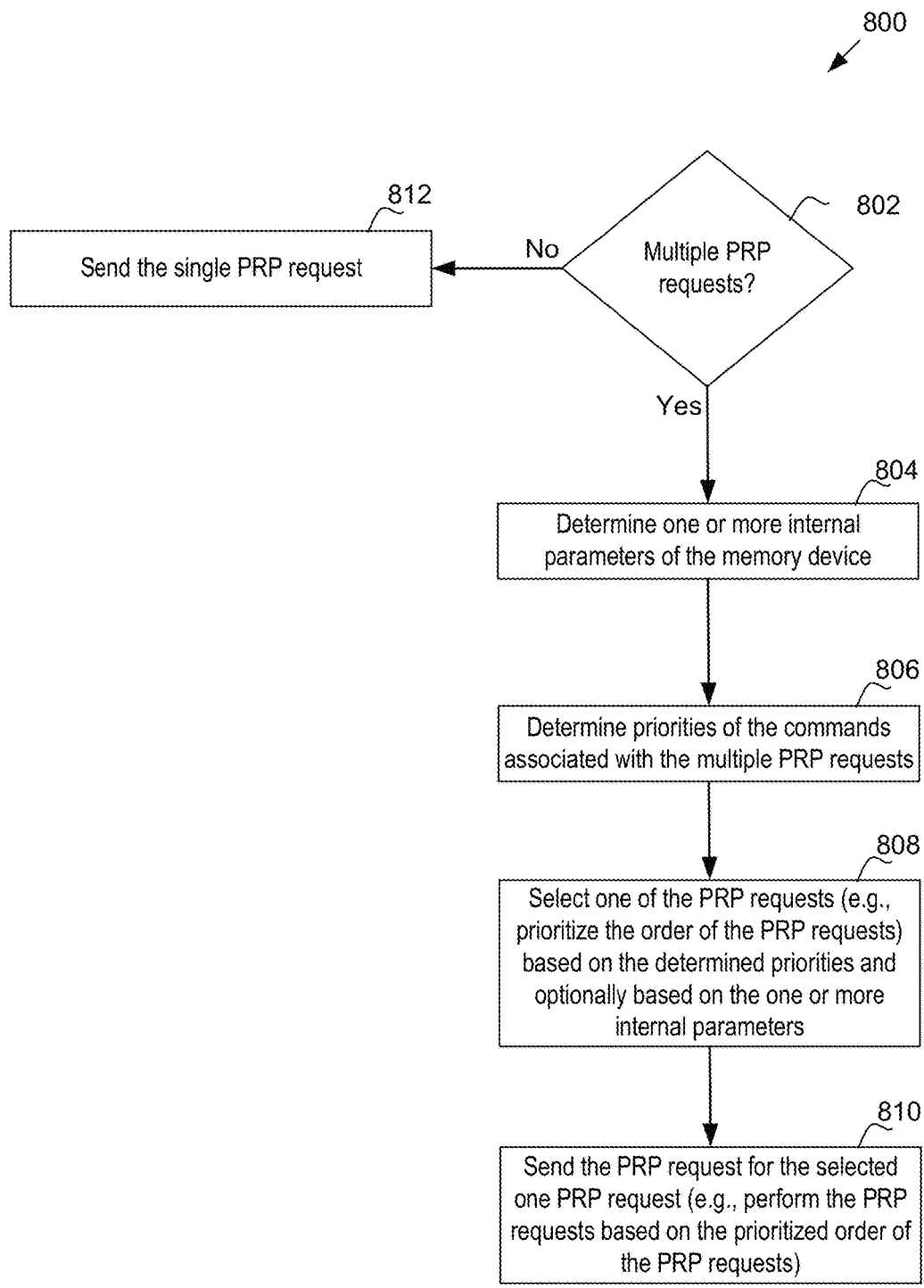
FIG. 8 is a flow chart of processing multiple PRP requests by determining priorities of commands associated with the multiple PRP requests.

As discussed above, various specific commands may use the priority of the commands to determine the order in which to execute the commands. As one example, PRP fetching may consider the priority of the submission queues in determining order of the PRP fetch. In particular, in order to increase performance, the memory device may execute several commands in parallel. Thus, the device may send several PRP fetching requests which are associated with different NVMe commands. Instead of merely arbitrating amongst the several PRP fetching requests based only on the internal memory device state (e.g., memory array status), the priority of the command(s) associated with the current PRP fetching may also be considered. This is illustrated in FIG. 8, which is a flow chart 800 of processing multiple PRP requests by determining priorities of commands associated with the multiple PRP requests. At 802, it is determined whether there are multiple PRP requests. If not, at 812, the single PRP request is sent. If so, at 804, one or more internal parameters of the memory device are determined. At 806, the priorities of the commands associated with the multiple PRP requests are determined. At 808, one of the PRP requests is selected (e.g., the order of the PRP requests is prioritized) based on the determined priorities and optionally based on the internal parameters of the memory device. At 810, the PRP request is sent for the selected PRP request. For example, the PRP requests are performed in the prioritized order of the PRP requests.

Figure 9:
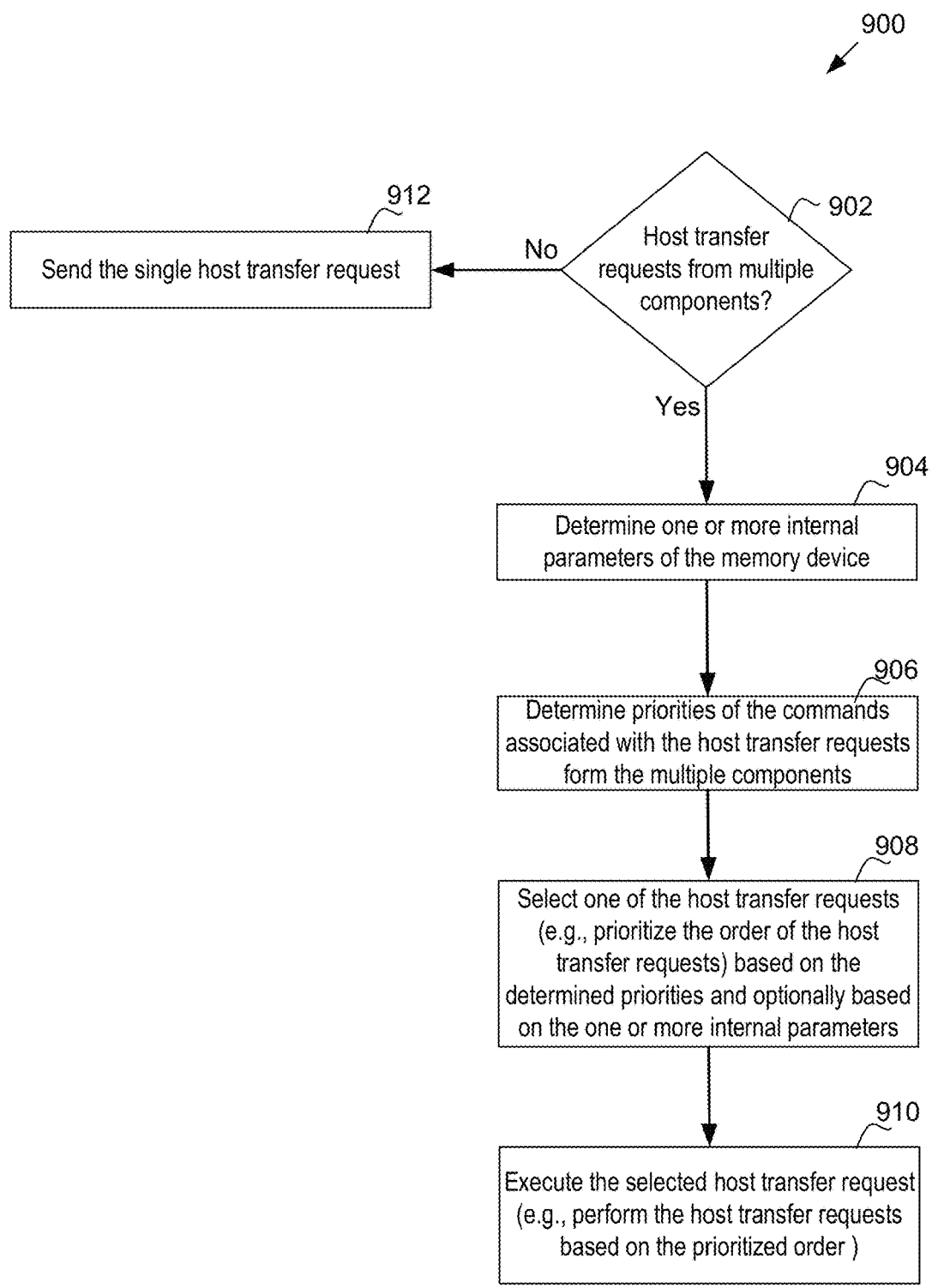
FIG. 9 is a flow chart of processing multiple host transfer requests by determining priorities of commands associated with the multiple host transfer requests.

As another example, commands, such as read commands, may result in data transfer from the memory device to the host device. The data transfer requests may come from several components in parallel. In particular, each memory array in memory arrays 442 is independent and may work in parallel with another memory array. Therefore, a data transfer scheduler in the memory device controller may receive host transfer requests in parallel from several components. Instead of scheduling only based on the internal device state (e.g., memory array status), the priority of the command(s) associated with the current data transfer may also be considered. This is illustrated in FIG. 9, which is a flow chart 900 of processing multiple host transfer requests by determining priorities of commands associated with the multiple host transfer requests. At 902, it is determined whether there are multiple host transfer requests from multiple components. If not, at 912, the single host transfer request is sent. If so, at 904, one or more internal parameters of the memory device are determined. At 906, the priorities of the commands associated with the multiple host transfer requests are determined. At 908, one of the host transfer requests is selected (e.g., the order of the host transfer requests is prioritized) based on the determined priorities and optionally based on the internal parameters of the memory device. At 910, the host transfer request is sent for the selected host transfer request. For example, the host transfer requests are performed in the prioritized order of the host transfer requests.

As discussed above, one or more operations may affect the completion queues. For example, the memory device posting entries to the completion queues (e.g., step 5 in FIG. 3), and interrupting the host device (e.g., step 6 in FIG. 3) affect the completion queues. In that regard, the memory device performing those operations may consider the priority associated with the command and/or the priority of the completion queue(s) in determining when to perform operations that affect the respective completion queue. Similar to submission queues, completion queues may have priorities. As discussed above, the mapping between submission queues and completion queues may be 1:1, but this is not necessarily the case. When working in 1:1 mapping, the priority of the completion queue may be equal to the relevant submission queue. When several submission queues are associated with the same completion queue, the priority of the completion queue may be equal to the highest submission queue priority associated to this completion queue.

Figure 10:
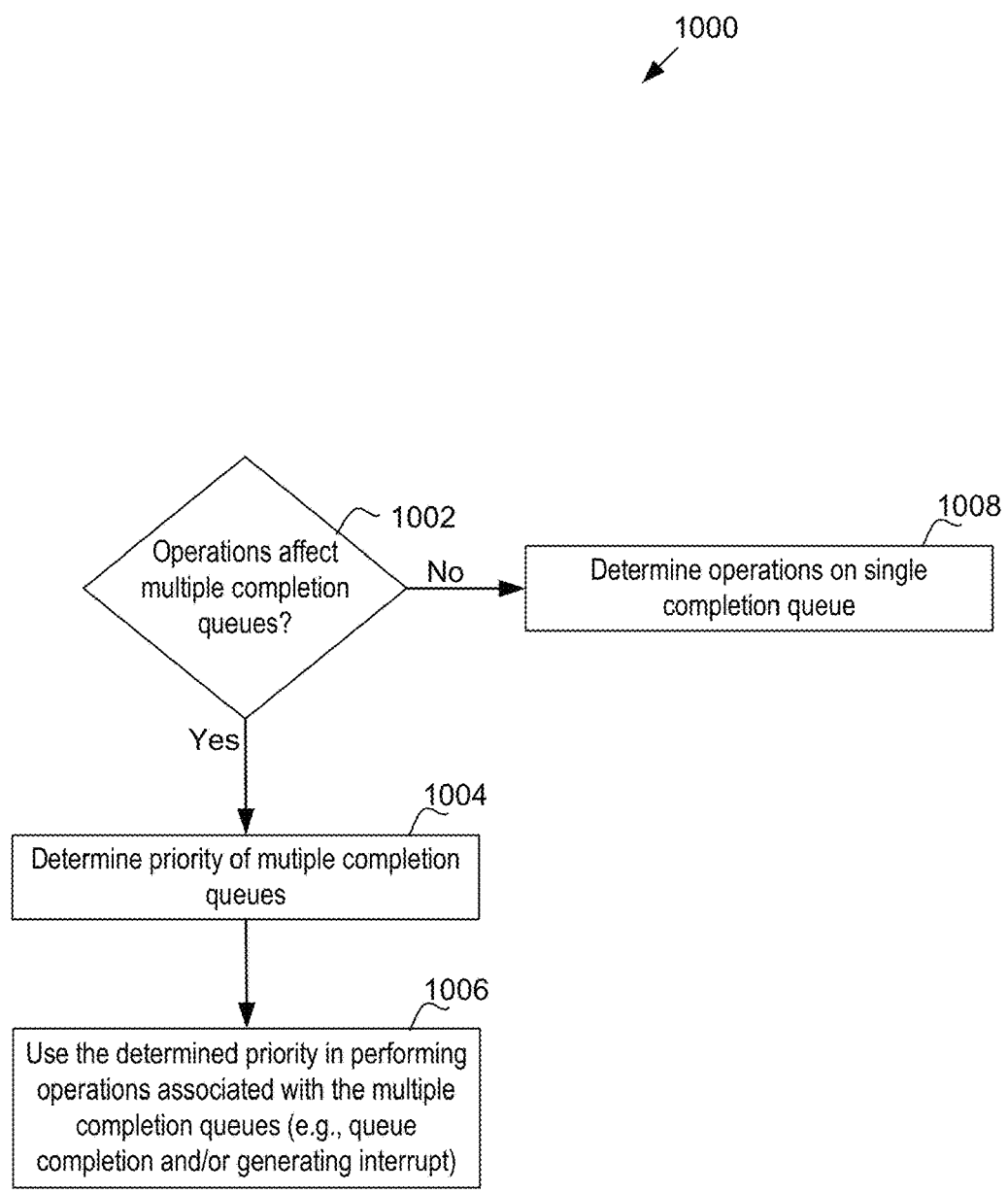
FIG. 10 is a flow chart of managing multiple completion queues by determining the priority of the multiple completion queues.

FIG. 10 illustrates is a flow chart 1000 of managing multiple completion queues by determining the priority of the multiple completion queues. At 1002, it is determined whether operations affect multiple completion queues. If not, at 1008, the operations on the single completion queue are determined. If so, at 1004, the priority of the multiple completion queues are determined. Thus, FIG. 10 illustrates one implementation in which the determined priority may comprise a priority relative to another command. Alternatively, the determined priority is not compared relative to another command. At 1006, the determined priority is used in performing operations associated with the multiple completion queues, such as queue completion and/or generating an interrupt to the host device.

Figure 11:
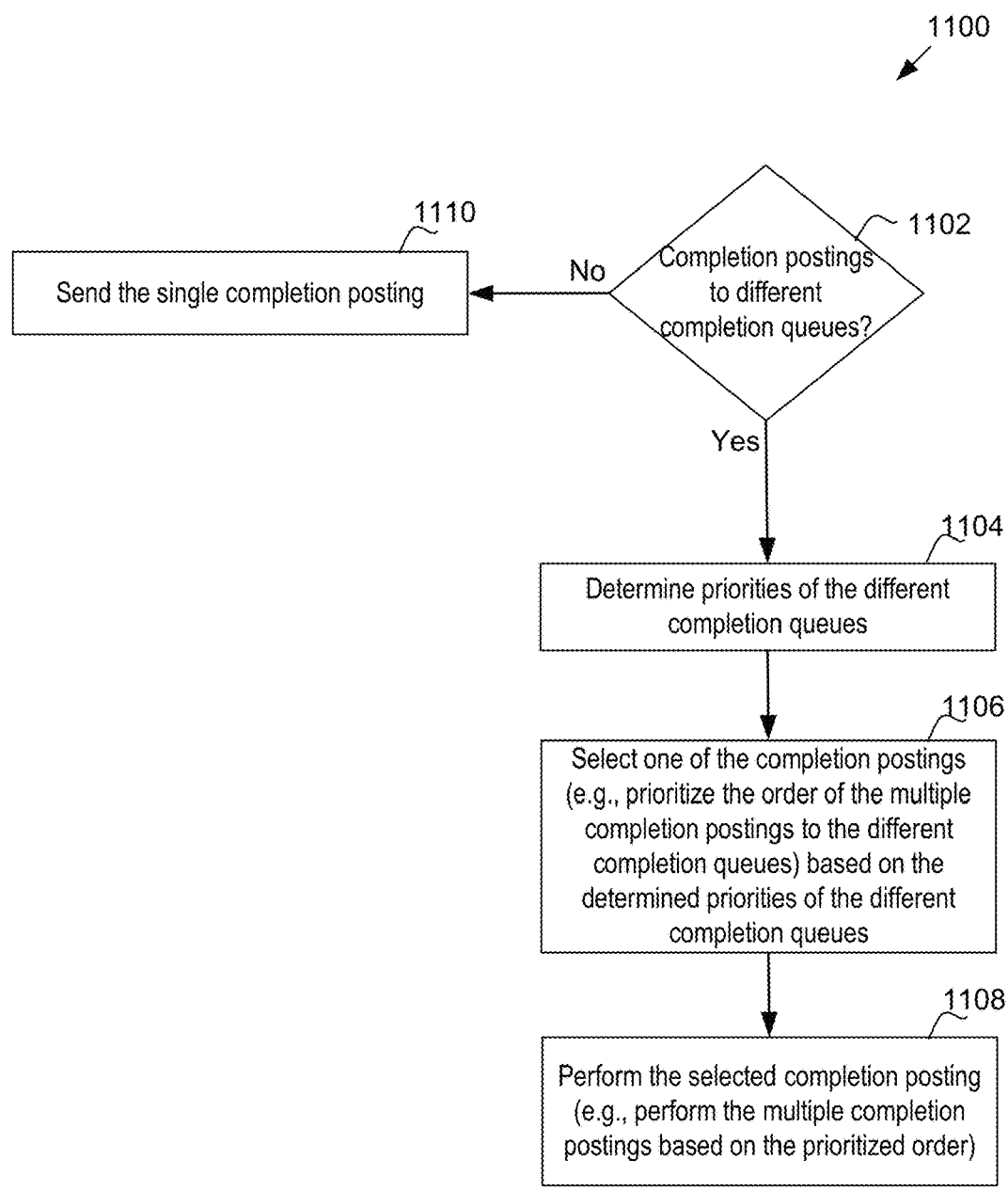
FIG. 11 is a flow chart for determining which completion posting, from amongst completion postings associated with multiple completion queues, to post to the completion queue by determining the priority of the multiple completion queues.

FIG. 11 is a flow chart 1100 for a specific implementation of operations regarding the completion queues, namely determining which completion posting, from amongst completion postings associated with multiple completion queues, to post to the completion queue by determining the priority of the multiple completion queues. Similar logic may be used when determine host interrupts. At 1102, it is determined whether there are completion postings to different completion queues. If not, at 1110, the single host transfer request is sent. If so, at 1104, the priorities of the different completion queues are determined. At 1106, one of the completion postings is selected (e.g., the order of the completion postings is prioritized) based on the determined priorities. At 1108, the completion posting is performed for the selected completion posting. For example, the completion postings are performed in the prioritized order of the host transfer requests.

The above discussion focuses on arbitration within a stage of execution. For example, arbitration may be performed at the command queuing stage, the command scheduling stage, the completion posting stage, the interrupt stage. Separate from that, priority of the commands may be used amongst different command execution phases (such as different command execution phases while accessing host memory). As one example, PRP fetching, data transfer and completion posting may request the egress bus at the same time. The arbitration logic may consider the priority of the command in such scenarios.

As discussed above, the memory device may use various criteria including any one, any combination, or all of the following: predetermined order of priority of phases; type of command; allocation of memory resources; depth of processing of the command; or maintaining a predetermined balance of commands in the different phases.

As one example, the phases may have a predetermined priority. As discussed above, the memory device may prioritize the phases in a predetermined order of priority. As one example, the memory device may prioritize according to (from highest priority to lowest): command fetching; PRP fetching; data transfer; completion queue posting; and interrupt notification. As another example, the completion queue posting and the interrupt notification may have a higher priority than command fetching, PRP fetching and data transfer.

The memory device may also prioritize based on a type of command (or a type of request). As discussed above, commands may necessitate different requests, such as a read request from the host device (e.g., a PCIe read request to read data from the host device) or a write request to the host device (e.g., a PCIe write request to write data to host device). There are different types of PCIe read requests including, without limitation: command fetching (e.g., the memory device reads a command from the submission queue resident on the host device); PRP fetching (e.g., the memory device, using a pointer, reads a PRP list from the host device); or data fetching (e.g., in an NVMe write command flow, the memory device reads data from the host that is to be written to flash memory). For PCIe read requests, the predetermined priority from highest to lowest may comprise: data fetching; PRP fetching; and command fetching. In one implementation, data fetching receives the highest priority since the memory device has already allocated the internal resources for this task. In that regard, the memory device may use the allocated internal resources in an effective way. The memory device may prioritize PRP fetching higher than command fetching since in a few cycles, the memory device may have data buffers available and may have to wait if the PRPs are not yet available.

Likewise, there are different types of PCIe write requests including, without limitation: write data to the host device (e.g., in an NVMe read command flow, the data that the memory device has read from flash memory is written to the host device); completion posting (e.g., the memory device writes an entry to the completion queue resident on the host device indicating that a command has been completed); or interrupts (e.g., an MSI-X interrupt to the host device indicative to the host device that there is an entry on the completion queue for review). For PCIe write requests, the predetermined priority from highest to lowest may comprise: interrupts; completion postings; and write data to the host device. In practice, an interrupt, such as an MSI-X interrupt, may require very little data (such as 4 bytes to send to the host device). Likewise, the completion queue entry may require transmission of 16 bytes of data to the host device. In contrast, writing data, such as in writing data to a host system when processing an NVMe read command, may include a large amount of data. Further, when the memory device has completed all the phases of processing the command, the memory device may release the internal resources to process the command (e.g., memory space, processing capability, etc.). In this regards, the memory device may prioritize the last phases of processing certain commands (such as completion queue posting and sending the interrupt to the host) in order to more quickly complete processing the commands and, in turn, more quickly release internal resources. On the host system side, completing the processing the commands may likewise lead to release of host system internal resources (such as buffers resident on the host system).

Alternatively, or in addition to assigning priorities to different phases, the memory system may balance the commands being processed in the different phases. For example, the memory system may assign ranges of the number of commands, such as a lower and upper bound, that are to be processed in the different phases. More specifically, the fetching phase may have an upper bound, such as 10 commands and a lower bound, such as 2 commands. In practice, the memory system may examine the number of commands that have currently been fetched and determine whether the number of commands are within the upper and lower bounds. If the number of commands is less than the lower bound, the memory system may fetch more commands. If the number of commands is greater than the upper bound, the memory system may assess fetching of commands to a lower priority. In balancing the phases, the memory device does not neglect the different operations. For instance, if command fetching is consistently neglected, the memory system might reach a point where all PRPs fetching and data transfers are completed, but the memory system has no pending commands. In this instance, waiting to fetch the commands without the ability to perform processing in any other phase may be inefficient.

Figure 12:
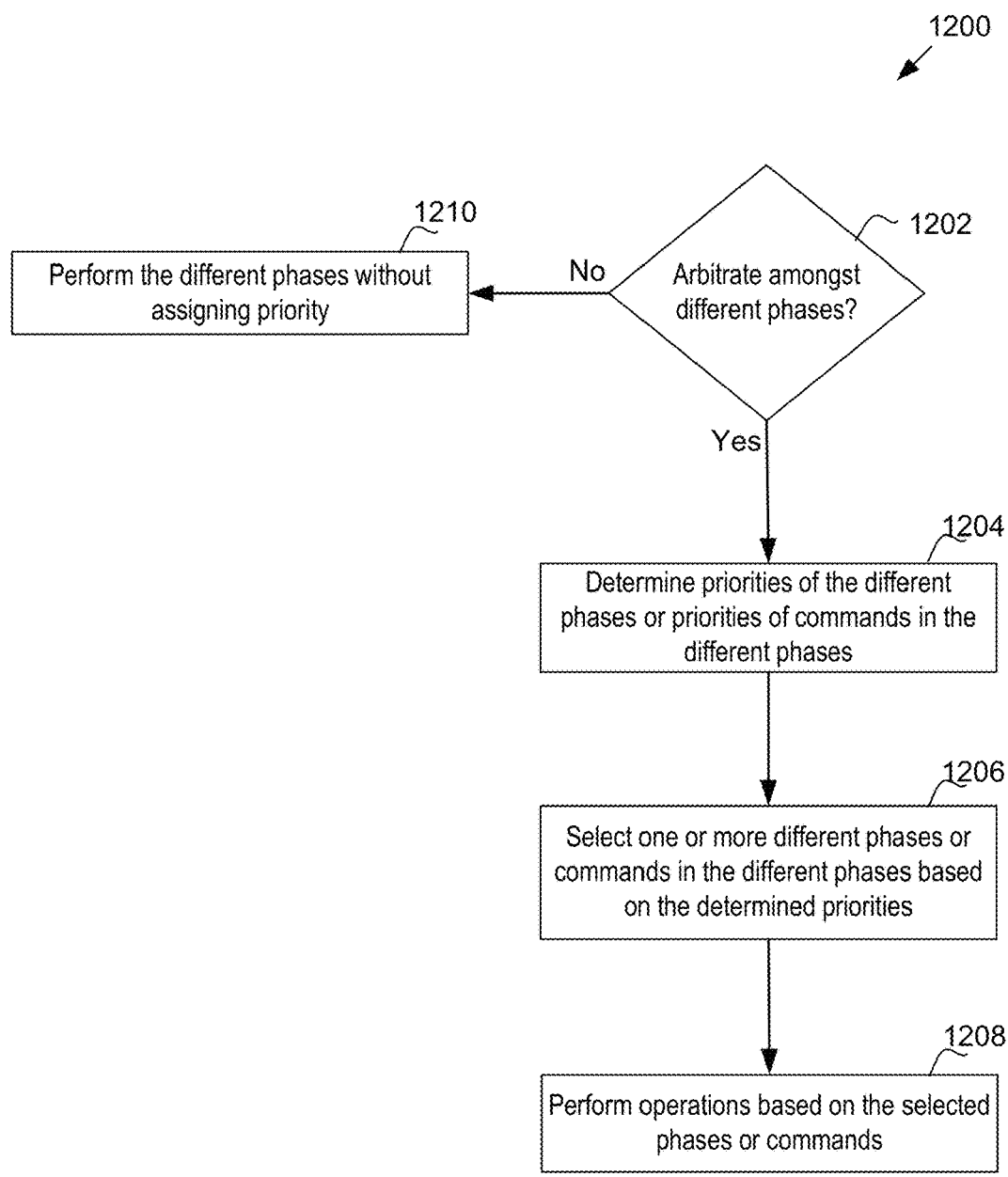
FIG. 12 is a flow chart for determining priorities amongst commands in different phases of operation.

FIG. 12 is a flow chart 1200 for determining priorities amongst commands in different phases of operation. As discussed above, commands undergo a series of different phases, such as fetching the command(s), processing the command, posting the completion message; and generating an interrupt to the host device indicating that an entry has been placed on the completion queue. Further, within a specific phase, the command may include different sub-phases. As merely one example, in processing the command, the memory device may perform internal command selection and execute the command. As another example, in executing the command, such as a read command, the memory device may perform error correction (such as error correcting the data that is read from the flash), encryption or decryption, and the like.

Thus, the memory device may arbitrate amongst the different phases of the command. Alternatively, or in addition, the memory device may arbitrate amongst the different sub-phases of the command. At 1202, the memory device determines whether to arbitrate amongst the different phases. If not, at 1210, the memory device performs the different phases without assigning priority. If so, at 1204, the memory device determines priorities of the different phases (and/or the different sub-phases) or priorities of the commands in the different phases. For example, the memory device may have pre-defined priorities associated with the different phases, such as assigning a higher priority to completion queue updates and generating interrupts over fetching and executing commands. As another example, the memory device may dynamically analyze the state of operation of the memory device and, in response to the analysis, dynamically assign priorities to the different phases. In one specific example, the memory device may determine that there are a number of fetched commands higher than a first predetermined amount and a number of executing commands lower than a second predetermined amount. In this specific example, the memory device may thereafter prioritize executing commands over fetching commands (such as until the number of fetched commands is lower than the first predetermined amount and/or until the number of executing commands is greater than the second predetermined amount). Alternatively, or in addition, the memory device may determine priorities of specific commands in the different phases. In particular, specific commands may have associated priorities. For example, command 1 may have assigned priority 1 and may be in phase 1, whereas command 2 may have assigned priority 2 and may be in phase 2. The memory device may determine, based on the associated priorities of commands 1 and 2, whether to perform phase 1 for command 1 before or after performing phase 2 for command 2. At 1206, the memory device selects one or more different phases or commands in the different phases based on the determined priorities. At 1208, the memory device performs operations based on the selected phases or commands.

Figure 13:
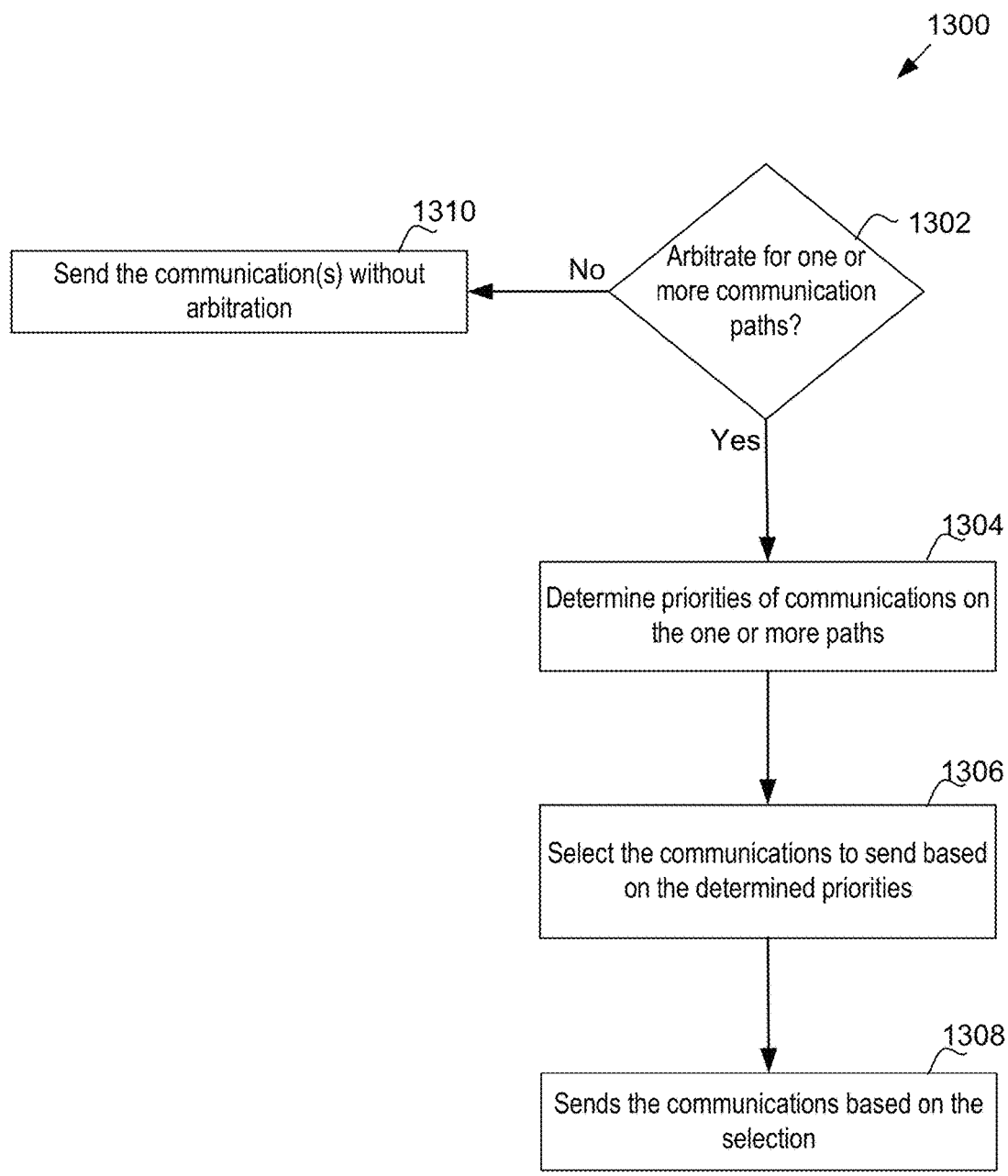
FIG. 13 is a flow chart for determining priorities of communications in one or more paths of the communication interface between the host device and the memory device.

FIG. 13 is a flow chart 1300 for determining priorities of communications in one or more paths of the communication interface between the host device and the memory device. As discussed above, the communication interface between the host device and the memory device may be simplex or duplex. In that regard, the memory device may arbitrate communications in either implementation. For example, in duplex, the memory device may arbitrate amongst communications for the ingress path and/or the egress path, as discussed above. At 1302, the memory device determines whether to arbitrate amongst the one or more communication paths. If not, at 1308, the memory device sends the communication(s) without arbitration. If so, at 1304, the memory device determines priorities of communication(s) on the one or more paths. At 1306, the memory device selects the communications based on the determined priorities. Finally, at 1308, the memory device sends the communications based on the selection.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to process one or more commands, the method comprising:
   fetching commands from a plurality of submission queues, a host device having caused the commands to be stored in the plurality of submission queues for the memory device to process the commands;
   determining a priority of the commands;
   after fetching, processing the commands based on the determined priority, wherein processing each command comprises performing a plurality of phases, some of which require communication between the memory device and the host device via a communication interface; and
   determining a priority of the plurality of phases based on a level of activity of the communication interface between the memory device and the host device, wherein for at least some of the plurality of phases, phases that do not require communication between the memory device and the host device are given higher priority than phases that do require communication between the memory device and the host device, irrespective of the priority of the commands associated with the phases.

2. The method of claim 1, wherein:
   processing the commands comprises the memory device causing indications to be stored in one or more completion queues, a respective indication indicative that a respective command has been executed by the memory device; and
   causing the indications to be stored in the one or more completion queues is based on the determined priority.

3. The method of claim 1, wherein processing the commands comprises the memory device:
   causing indications to be stored in one or more completion queues, a respective indication indicative that a respective command has been executed by the memory device; and
   generating an interrupt to the host device, the interrupt indicative to the host device that the indications are stored in the one or more completion queues;
   wherein generating the interrupt to the host device is based on the determined priority.

4. The method of claim 1, wherein determining the priority of the commands comprises:
   determining a respective submission queue associated with a respective command; and
   assigning the priority for the respective command based on a priority of the respective submission queue.

5. The method of claim 4, wherein:
   the plurality of submission queues comprises a first submission queue and a second submission queue;
   the first submission queue is assigned a higher priority than the second submission queue; and
   processing of the commands fetched from the first submission queue is assigned a higher priority than processing of the commands fetched from the second submission queue.

6. The method of claim 5, wherein:
   the first submission queue comprises an administrative submission queue; and
   the second submission queue comprises a non-administrative submission queue.

7. The method of claim 1, wherein determining the priority of the commands comprises:
   determining a command type of a respective command; and
   assigning the priority for the respective command based on the command type.

8. The method of claim 1, wherein determining the priority of the commands comprises:
   determining an address associated with a respective command; and
   assigning the priority for the respective command based on the determined address.

9. A non-volatile memory device comprising:
   a non-volatile memory having a plurality of memory cells;
   a communication interface configured to communicate with a host device, the memory device to perform one or more actions related to commands fetched from one or more submission queues, the one or more actions comprising actions the memory device performs in processing the fetched commands; and
   a controller in communication with the non-volatile memory and the communication interface, the controller configured to:
   fetch commands from one or more submission queues;
   determine a priority of the fetched commands;
   process the commands based on the determined priority, wherein processing each command comprises performing a plurality of phases, some of which require communication between the memory device and the host device via a communication interface; and
   determine a priority of the plurality of phases based on a level of activity of the communication interface between the memory device and the host device, wherein for at least some of the plurality of phases, phases that do not require communication between the memory device and the host device are given higher priority than phases that do require communication between the memory device and the host device, irrespective of the priority of the commands associated with the phases.

10. The non-volatile memory device of claim 9, wherein:
    the plurality of phases comprises obtaining physical region pages associated with the fetched commands; and the controller is configured to determine the order of obtaining the physical region pages for the fetched commands based on the determined priority of the fetched commands.

11. The non-volatile memory device of claim 9, wherein the plurality of phases is associated with one or more completion queues.

12. The non-volatile memory device of claim 11, wherein the plurality of phases comprises causing an indication of a command completion to be written to a respective completion queue.

13. The non-volatile memory device of claim 11, wherein the plurality of phases comprises generating an interrupt to the host device to indicate to the host device that an indication of a command completion is written to a respective completion queue.

14. The non-volatile memory device of claim 9, wherein the controller is configured to determine the priority of the fetched commands by:
    determining a respective submission queue associated with a respective command; and
    assigning the priority for the respective command based on a priority of the respective submission queue.

15. The non-volatile memory device of claim 9, wherein the controller is configured to determine the priority of the fetched commands by:
    analyzing at least one aspect of the fetched commands; and
    assigning the priority for the fetched commands based on the analysis of the at least one aspect of the fetched commands.

16. The non-volatile memory device of claim 15, wherein the at least one aspect comprises a type of the fetched commands.

17. The non-volatile memory device of claim 15, wherein the at least one aspect comprises a memory address associated with the fetched commands.

18. A non-volatile memory system comprising:
    a non-volatile memory having a plurality of memory cells;
    a communication interface configured to communicate with a host device;
    means for fetching commands, via the communication interface, from a plurality of submission queues, the host device causing the commands to be stored in the plurality of submission queues;
    means for determining a priority of the commands;
    means for processing the commands based on the determined priority, wherein processing each command comprises performing a plurality of phases, some of which require communication between the memory device and the host device via a communication interface; and
    means for determining a priority of the plurality of phases based on a level of activity of the communication interface between the memory device and the host device, wherein for at least some of the plurality of phases, phases that do not require communication between the memory device and the host device are given higher priority than phases that do require communication between the memory device and the host device, irrespective of the priority of the commands associated with the phases.

19. The non-volatile memory system of claim 18, wherein the means for determining the priority of the commands is further based on a respective submission queue from which a respective command was fetched.

20. The method of claim 1, wherein:
    the communication interface comprises an ingress path and an egress path;
    determining the need for the communication interface comprises determining a state of the egress path; and
    determining the priority of the commands further comprises determining the priority based on the determined state of the egress path.

21. The non-volatile memory device of claim 9, wherein:
    the communication interface comprises an ingress path and an egress path; and
    the controller is further configured to:
        determine the need for the communication interface by determining a state of the egress path; and
        determine the priority of the fetched commands based on the determined state of the egress path.

* * * * *